(12) United States Patent
Rocha et al.

(10) Patent No.: US 11,470,832 B2
(45) Date of Patent: Oct. 18, 2022

(54) PLUG-IN INSECT TRAP WITH REPLACEABLE ADHESIVE CARD

(71) Applicant: Dynamic Solutions Worldwide, LLC, Milwaukee, WI (US)

(72) Inventors: Juan J. Rocha, Lake Forest, IL (US); Robert A. Seaton, Verona, WI (US)

(73) Assignee: Dynamic Solutions Worldwide, LLC, Milwaukee, WI (US)

(*) Notice: Subject to any disclaimer, the term of this patent is extended or adjusted under 35 U.S.C. 154(b) by 256 days.

(21) Appl. No.: 16/269,264

(22) Filed: Feb. 6, 2019

(65) Prior Publication Data
US 2020/0245606 A1 Aug. 6, 2020

(51) Int. Cl.
*A01M 1/14* (2006.01)
*A01M 1/16* (2006.01)

(52) U.S. Cl.
CPC .............. *A01M 1/145* (2013.01); *A01M 1/16* (2013.01)

(58) Field of Classification Search
CPC .......... A01M 1/04; A01M 1/08; A01M 1/145; A01M 1/16
See application file for complete search history.

(56) References Cited

U.S. PATENT DOCUMENTS

| 1,461,169 | A | * | 7/1923 | Wilson | A01M 1/145 43/113 |
| 5,044,112 | A | * | 9/1991 | Williams | A01M 1/145 43/113 |
| 5,353,542 | A | * | 10/1994 | Vaudry | A01M 1/145 43/107 |
| 5,713,153 | A | * | 2/1998 | Cook | A01M 1/02 43/114 |
| 5,915,948 | A | | 6/1999 | Kunze et al. | |
| 6,568,124 | B1 | | 5/2003 | Wilbanks | |
| 7,161,313 | B2 | | 1/2007 | Piepgras et al. | |
| 2003/0154644 | A1 | * | 8/2003 | Lambert | A01M 1/145 43/107 |
| 2004/0200129 | A1 | * | 10/2004 | Studer | A01M 1/026 43/113 |
| 2008/0229652 | A1 | * | 9/2008 | Willcox | A01M 1/145 43/113 |
| 2009/0038207 | A1 | * | 2/2009 | Lin | A01M 1/223 43/112 |
| 2009/0262535 | A1 | * | 10/2009 | Maillet-Jegou | F21S 8/033 362/253 |
| 2010/0263260 | A1 | | 10/2010 | Engelbrecht et al. | |
| 2012/0266519 | A1 | * | 10/2012 | Wright | A01M 1/106 43/113 |

(Continued)

FOREIGN PATENT DOCUMENTS

| GB | 2373705 A | * 10/2002 | ............ A01M 1/145 |
| GB | 2420957 A | * 6/2006 | ............. A01M 1/04 |
| KR | 1020190000020 | 1/2019 | |

*Primary Examiner* — Peter M Poon
*Assistant Examiner* — Kari A Bradberry
(74) *Attorney, Agent, or Firm* — Boyle Fredrickson S.C.

(57) ABSTRACT

An insect trap connectable to an electrical wall outlet is provided that releasably receives a replaceable card for trapping insect to an adhesive material. A light bar emits light in a sideways direction rearward of the card while the fan blocks forward light to produce a glow that attract insects to the adhesive surface of the card. The card is supported in cantilever by the insect trap.

18 Claims, 3 Drawing Sheets

(56) References Cited

U.S. PATENT DOCUMENTS

| | | | |
|---|---|---|---|
| 2013/0152451 A1* | 6/2013 | Larsen | A01M 1/04 |
| | | | 43/113 |
| 2014/0013650 A1 | 1/2014 | Larsen | |
| 2018/0184635 A1 | 7/2018 | Studer et al. | |
| 2018/0235202 A1* | 8/2018 | Sandford | A01M 1/02 |
| 2019/0045771 A1* | 2/2019 | Rocha | A01M 1/145 |
| 2019/0141983 A1* | 5/2019 | Morton | F21S 10/06 |
| | | | 250/494.1 |
| 2019/0174736 A1* | 6/2019 | Smith | A01M 1/145 |

* cited by examiner

PLUG-IN INSECT TRAP WITH REPLACEABLE ADHESIVE CARD

CROSS-REFERENCES TO RELATED APPLICATIONS

--

BACKGROUND OF THE INVENTION

This invention relates to the field of insect traps. More specifically, this invention relates to an insect trap that plugs into an electrical wall outlet and uses ultraviolet light to attract insects to the trap. The insect trap provides a removable and replaceable fan-shaped card (referred to herein as a "fan") for capturing the insects when the insect lands on the sticky adhesive substance of the fan.

There are many known attractants and lures for drawing insects to a trap. One commonly known attractant is light, such as ultraviolet light, which insects are drawn to and will gather around. Another attractant are chemical substances (natural or synthetic) that are detected by insects. The insects have a keen ability to detect scents in the chemicals, such as the smell of carbon dioxide (normally emitted by warm-blooded animals) or pheromones (produced by the insects themselves during mating), and are attracted to the scent of these chemicals.

Once the insects are drawn to the insect trap, a trapping mechanism is used to retain and/or kill the insects. One common trapping mechanism is sticky paper or fly paper which is coated with a sticky adhesive substance such that when the insects come into contact with the paper they are stuck to the adhesive substance and cannot escape. The adhesive substance may also contain a chemical attractant to lure insects into landing on the paper.

Features of such an insect trap are provided in U.S. application Ser. No. 15/673,831, entitled "Plug-In Insect Trap", also assigned to the present applicant, and hereby incorporated by reference.

SUMMARY OF THE INVENTION

The present invention is an electrical wall outlet connectable insect trap for luring insects to the trap and trapping them to an adhesive of the trap. The insect trap provides a base that is connectable to an electrical outlet and powered by the electrical outlet to provide an emission of light in a direction substantially parallel to the wall of the electrical outlet. A fan is releasably insertable into the base to provide an aesthetically pleasing front surface, to block forward light to create a "glow" around the trap, and provide a rearwardly exposed adhesive surface such that insects trapped by the adhesive are hidden from view.

One embodiment of the present invention provides a plug-in insect trap having an electrical housing having rearward facing electrical connectors connectable into an electrical outlet and an insect attractant lamp supported by the electrical housing. The electrical housing releasably receives an upwardly extending card supported in cantilever and having an opaque front surface and a rearwardly exposed sticky rear surface.

It is thus a feature of at least one embodiment of the invention to provide a plug in insect trap without an enclosure and where the adhesive card can be inserted or removed free from any obstruction or intervening structure.

The upwardly extending card may be releasably supported on a bottom end of the upwardly extending card for exchange of the card by the user. The upwardly extending card may provide opposed broad faces bounded by peripheral side edges and upper and lower edges and wherein the upwardly extending card is extended in cantilever to fully expose the upper edge and side edges.

It is thus a feature of at least one embodiment of the invention to allow a rear side of the adhesive card to be exposed allowing insects to get trapped to the sticky substance. The enclosure-less design provides insects with a direct pathway to the adhesive card where they are more easily captured.

The electrical housing may provide a slot releasably receiving the upwardly extending card. The slot may extend downwardly and laterally across an upper end of the electrical housing. The upwardly extending card may be supported on a front and rear surface by the slot of the electrical housing.

It is thus a feature of at least one embodiment of the invention to support the adhesive card on one end only with sufficient support so that it does not bend while leaving the other ends of the card exposed for light blocking and insect sticking functions.

The upwardly extending card may be planar. The upwardly extending card may be a paper material. The card may be configured to gaplessly nest in a stack of multiple cards for compact shipment.

It is thus a feature of at least one embodiment of the invention to use an inexpensive and disposable or recyclable adhesive card that can be inserted into the plug in trap as part of its utility and aesthetic appeal.

The insect attractant may be exclusively on a rear face of the upwardly extending card.

It is thus a feature of at least one embodiment of the invention to utilize the adhesive card and the wall as light reflecting surfaces in order to create a glowing light effect that attracts insects.

The insect attractant may be an upwardly extending light bar supporting a plurality of light emitting elements (LEDs).

It is thus a feature of at least one embodiment of the invention to utilize energy efficient LEDs that are able to produce ultraviolet emissions that attract certain types of insects.

The LEDs may be supported exclusively on left and right sidewalls of the light bar to project light in a primary lateral direction parallel to a surface of a wall supporting the electrical outlet when the plug-in insect trap is connected to the electrical outlet. Light may be emitted in sideways directions only.

It is thus a feature of at least one embodiment of the invention to utilize light efficiently by directing the light parallel to the adhesive card instead of into the wall or into the adhesive card, which is absorbed and wasted. This allows smaller and less energy consuming LEDs to be used.

The LEDs may emit light at two distinct frequency bands. The LEDs may emit light at 369 nm and 398 nm.

It is thus a feature of at least one embodiment of the invention to attract different types of insects that are attracted to different wavelengths of light.

The upwardly extending card may block light from the insect attractant lamp in a forward direction.

It is thus a feature of at least one embodiment of the invention to create a "halo effect" behind the adhesive card, resulting in the greatest distribution of light.

An alternative embodiment of the present invention provides a method of trapping insects including the steps of: providing an insect trap having an electrical housing having rearward facing electrical connectors connectable into an electrical outlet and an insect attractant supported by the electrical housing. Then, inserting an upwardly extending card into a slot of the electrical housing to be supported in cantilever at a bottom end. The upwardly extending card has an opaque front surface and a rearwardly exposed sticky rear surface.

The upwardly extending card may be inserted in a downwardly direction into the slot.

The method may further comprise the step of removing the upwardly extending card in an upward direction.

The peripheral side edges of the card may be exposed.

These particular objects and advantages may apply to only some embodiments falling within the claims and thus do not define the scope of the invention.

DETAILED DESCRIPTION OF THE INVENTION

Figure 1:
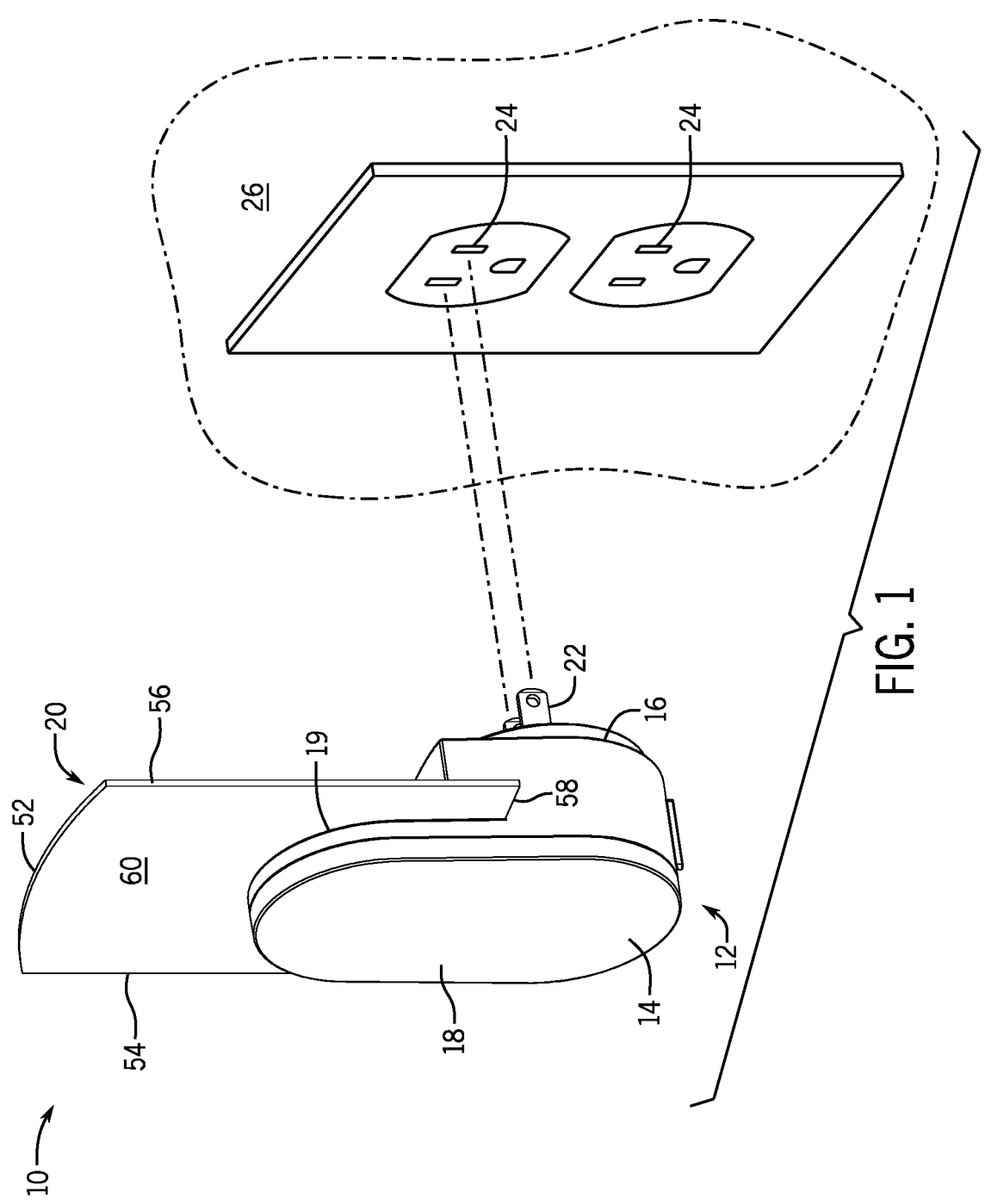
FIG. 1 is a front perspective view of an insect trap according to the present invention having a base connectable to an electrical wall outlet and supporting an upwardly exposed fan.
Figure 2:
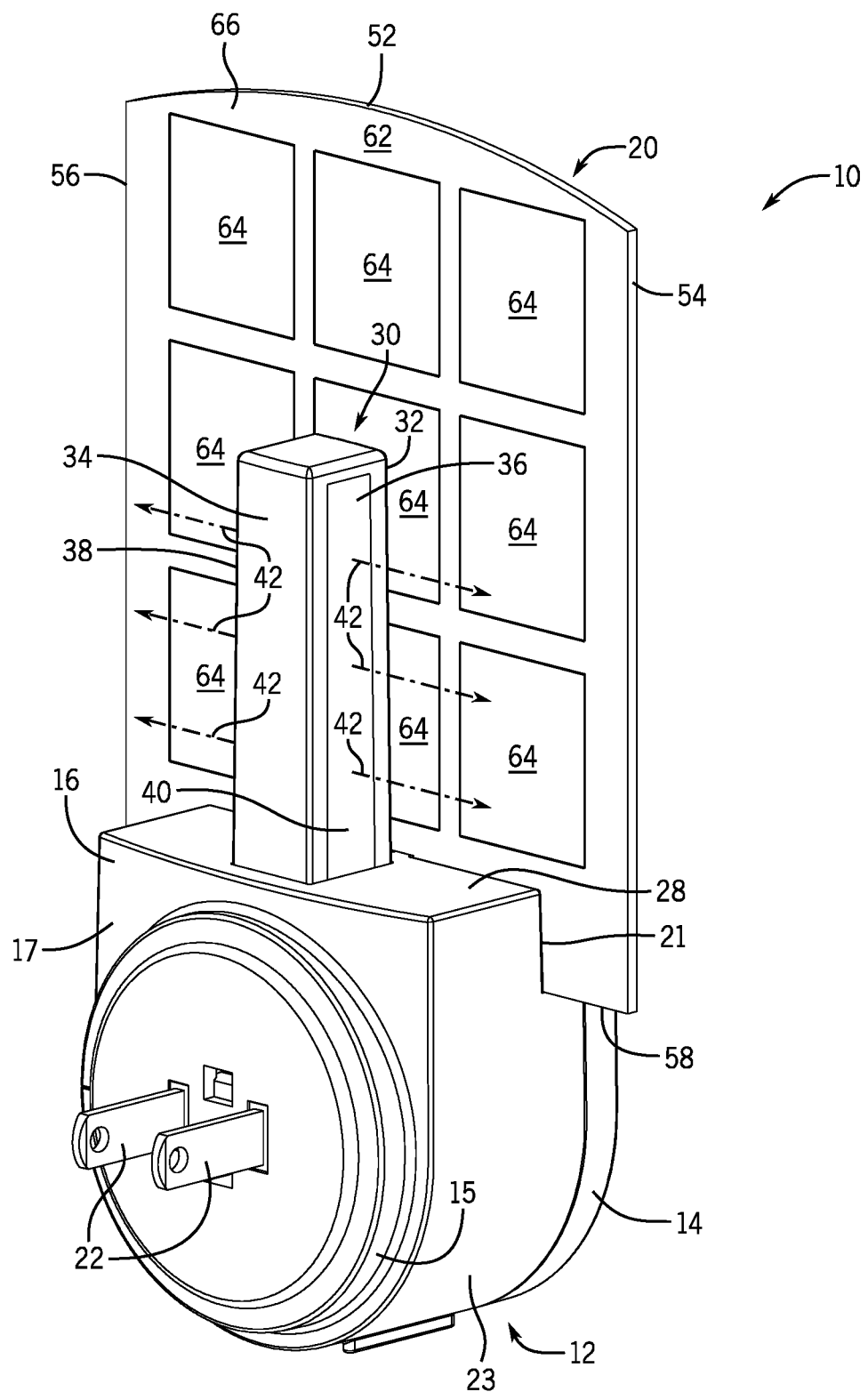
FIG. 2 is a rear perspective view of the insect trap of FIG. 1 revealing an upwardly extending light bar providing a lateral projection of light behind the upwardly exposed fan where a rear surface includes an adhesive.

Referring to FIGS. 1 and 2, a front and rear perspective view, respectively, of an insect trap 10 according to the present invention is shown. The insect trap 10 includes a lower electrical base 12 supporting a releasably insertable upwardly extending fan 20 carrying an adhesive on a rear surface for catching insects.

The lower electrical base 12 has a generally oval construction with a front cover 14 and a rear cover 16 flanking the upwardly extending fan 20. As seen in FIG. 1, the front cover 14 provides a solid elliptic cylinder having a substantially planar forward facing front side 18 opposite a substantially planar rearward facing rear side 19. Each of the front side 18 and rear side 19 of the front cover 14 present a substantially oval face. In one embodiment, the front cover 14 is approximately 93 mm in height, 54 mm in width, and 10 mm in depth. A lower end of the rear side 19 of the front cover 14 is joined to the rear cover 16.

As seen in FIG. 2, the rear cover 16 is a lower half of a solid elliptic cylinder having a substantially planar rearward facing rear side 17 opposite a substantially planar forward facing front side 21 joined to the front cover 14. Each of the rear side 17 and front side 21 of the rear cover 16 present a substantially half oval face.

The joined rear side 19 of the front cover 14 and front side 21 of the rear cover 16 define an enclosure 23 carrying internal electrical components (not shown) for powering lighting components of the insect trap 10 to be described further below. In one embodiment, the enclosure 23 may be approximately 55 mm in height, 54 mm in width, and 37.5 mm in depth.

The outer form factor of the lower electrical base 12 may be less than 93 mm in height, 54 mm in width, and 37.5 mm in depth.

The rear side 17 of the rear cover 16 supports rearwardly extending electrical prongs 22 insertable into an electrical outlet 24 of a wall 26. The prongs 22 may extend rearwardly from the rear side 17 by circular wheel 15 spacing the rear side 17 from the wall 26. The circular wheel 15 is rotatable, for example 90 degrees, to allow the prongs 22 to be positioned in different orientations, for example, depending on the orientation of the electrical outlet 24. In one embodiment, the prongs 22 are spaced horizontally, and in another embodiment, the prongs 22 are spaced vertically. The prongs 22 may correspond to standard AC power plugs used in North America, which are connected to primary alternating current power supply of a building (nominally 110 volts). The prongs 22 may correspond to a grounding type plug (3-prong) or non-grounding plug (2-prong). It is understood that the prongs 22 may conform to any power connector standard used around the world for different types of voltage and current rating, shape, size, and type of connector as understood in the art.

Figure 3:
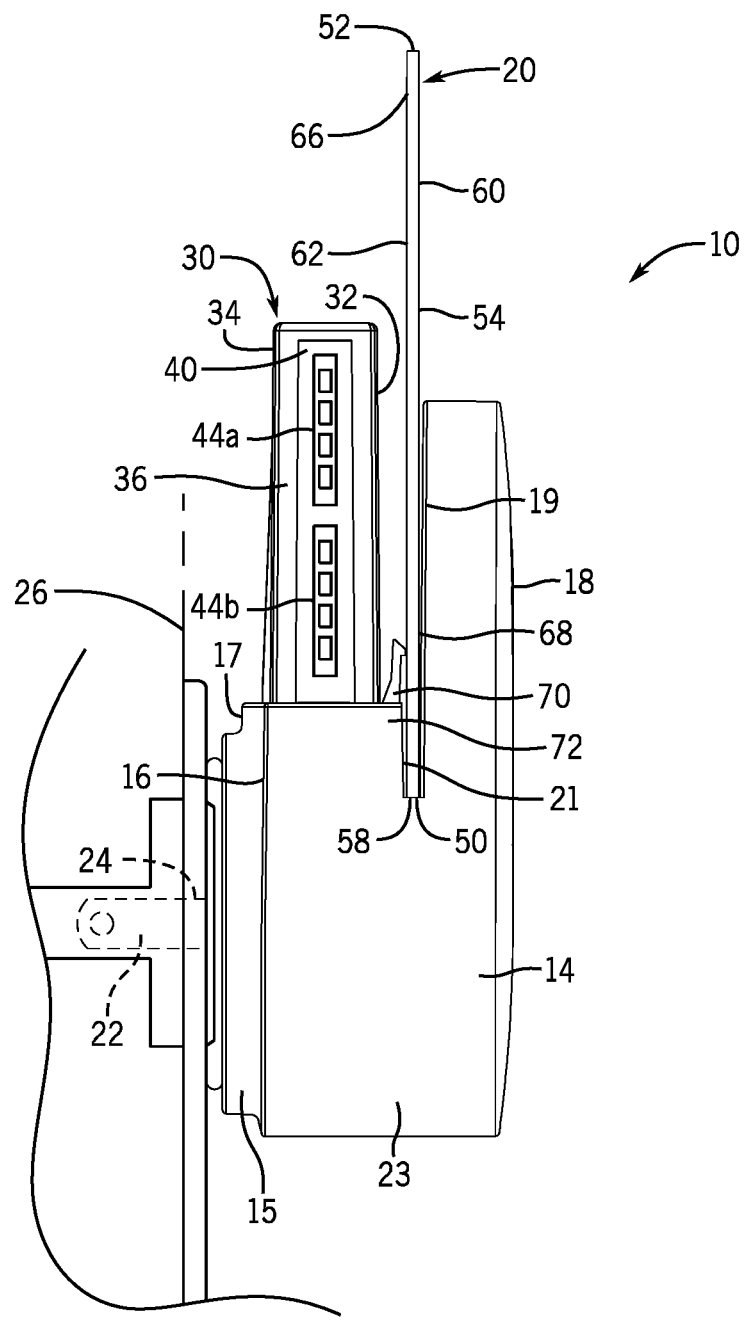
FIG. 3 is a side elevation view of the insect trap of FIG. 1 showing the base receiving the upwardly exposed fan on a bottom end in a cantilevered fashion.

Referring also to FIG. 3, an upper edge of the rear cover 16 provides a rectangular ledge 28 supporting an upwardly extending light bar 30 spaced rearwardly from but parallel to the front cover 14. The light bar 30 has a generally rectangular construction having front and rear sidewalls joined by lateral sidewalls. In this respect, the light bar 30 may have a front side 32 directed toward the front cover 14 in a forward direction, a rear side 34 directed toward the wall 26 in a rearward direction, and lateral sides 36, 38 directed toward the left and right sides, respectively, of the rear cover 16 in left and right directions. The light bar 30 may be attached proximate a center of the rectangular ledge 28 and extend upwardly to a height substantially equivalent to a height of the front cover 14. In one embodiment, the light bar 30 may be approximately 38 mm in height, 9 mm in width and 9.5 mm in depth. It is understood that the light bar 30 may also take a cylindrical or triangular configuration or another shaped construction without deviating from the spirit of the invention.

The lateral sides 36, 38 of the light bar 30 provide openings 40 allowing for light to be projected primarily in left and right lateral directions as shown by direction arrows 42 directed substantially parallel to the wall 26. The light emissions may be provided by a plurality of light-emitting diodes (LEDs) 44 spaced along a height of the light bar 30 and powered by electrical components held within the enclosure 23 of the lower electrical base 12 as understood in the art. The LEDs 44 may be different types of LEDs emitting light at two distinct frequency bands to provide attraction of different types of insects. In one embodiment, a first set of LEDs 44a may emit ultraviolet light at or about 369 nm and a second set of LEDs 44b may emit ultraviolet light at or about 398 nm. It is understood that any number of LEDs 44 may be included in each set of LEDs and arranged on opposing sides of the light bar 30. In one embodiment, the first set of LEDs 44a may include a single LED, and the second set of LEDs 44b may include a single LED. In another embodiment, the first set of LEDs may include two or more LEDs and the second set of LEDs may include two or more LEDs. A smaller number of LEDs and more energy efficient LEDs may be used due the efficient orientation of the LEDs. It is also understood that other types of light sources may be used such as fluorescent bulbs.

The fan 20 is releasably insertable into a slot 50 flanked by the front cover 14 and rear cover 16 of the lower electrical base 12. The slot 50 may be a downwardly extending aperture formed between the front cover 14 and rear cover 16. The slot 50 may have a rectangular cross section and in one embodiment may has a width of approximately 1 mm, or slightly wider than the thickness of the fan 20, and a depth of approximately 10-15 mm.

The fan 20 provides a substantially planar, rectangular card having a curved upper edge 52 and a straight lower edge 58 joined by straight peripheral side edges 54, 56 on the left and right, respectively. The fan 20 may be a pasteboard or heavy-duty stiff paper that is generally opaque and has a rigidity and impact resistance higher than regular paper. In one embodiment, the fan 20 has a thickness over 0.25 mm and does not easily bend. The width of the fan 20 is generally greater than a width of the lower electrical base 12 so that it extends over the outer lateral edges of the lower electrical base 12. The height of the fan 20 is higher than a height of the front cover 14 and the light bar 30 so as to block the light bar 30 from forward view. In one embodiment the fan 20 is approximately 85 mm in height and 72 mm in width. The fan 20 may be recyclable, constructed either of paper materials as discussed or a recyclable plastic material.

The fan 20 provides a front surface 60 opposite a rear surface 62 where the rear surface 62 supports an adhesive material 64 for trapping insects. The adhesive material 64 may also be impregnated with a fragrant chemical to attract insects, or optionally, also includes a poisonous substance that kills insects that consume the substance. The adhesive material 64 may be applied to substantially the entire rear surface 62. The adhesive material 64 may be applied in squares separated in grid-like fashion. An upper edge 66 and lower edge 58 of the rear surface 62 may not include any adhesive material 64 to facilitate insertion and removal of the fan 20 into and out of the slot 50 without the user contacting the adhesive material 64 or insects or the adhesive contacting the slot 50. The front surface 60 may not include an adhesive material 64 and may be colored for aesthetic appeal and may be opaque or translucent. A legend may be placed on the rear surface 62 indicating the correct orientation of the fan 20.

The lower edge 58 of the fan 20 is received within the slot 50 such that approximately 10-15 mm of the bottom of the fan 20 is received within the slot 50. The fan 20 is further supported in an upright position on its front surface 60 and its rear surface 62. The lower end of the front surface 60 of the fan 20 abuts a lower rear side 68 of the front cover 14. The fan 20 extends further upward to expose the upper end of the front surface 60. In one embodiment, the fan 20 extends approximately 35-40 mm above the front cover 14. The rear surface 62 of the fan 20 abuts a retaining clip 70 positioned at an upper outer edge 72 of the slot 50 and pressing the fan 20 in a forward direction. The retaining clip 70 may be a cantilevered finger biased toward the front cover 14.

When the fan 20 is inserted within the slot 50, the fan 20 is releasably supported in a cantilevered manner by the lower electrical base 12 to provide a substantially exposed rear surface 62 allowing insects to be trapped by the adhesive material 64 of the rear surface 62. The opaque front surface 60 obscures the rear surface 62 from forward view. The fan 20 is upwardly exposed at the upper edge 52 and laterally exposed on the peripheral side edges 54, 56 of the fan 20 allowing the fan 20 to be releasably inserted and removed free from obstruction and without the impediment of an enclosure. The fan 20 is forwardly exposed and rearwardly exposed to block forward light from the light bar 30 and to trap insects to the adhesive material 64.

The fan 20 may be packaged and shipped with a wax or siliconized paper over the adhesive material 64 that is removed prior to being used. Therefore, a plurality of fans 20 may be packaged together in a nested, stacked configuration without sticking together for compact shipment.

The user removes the wax paper to expose the adhesive material 64 and the fan 20 is inserted into the lower electrical base 12 by sliding the fan 20 downward into the slot 50 of the lower electrical base 12 with the front surface 60 directed away from the wall 26 and the rear surface 62 directed toward the wall 26. It is understood that the slot 50 is exposed and clear from obstruction in an upward direction allowing downward insertion of the fan 20 into the slot 50. The slot 50 is also exposed and clear from obstruction in both lateral left and right directions which allows the user to, optionally, insert the fan 20 in sideways directions as well.

The prongs 22 of the lower electrical base 12 are plugged into the electrical outlet 24 of the wall 26. When the insect trap 10 is plugged into the wall 26, mains electricity is delivered to the electrical components of the electrical housing to power the LEDs 44. When the insect trap 10 is plugged into the wall 26, the front side 18 of the front cover 14 is directed away from the wall 26 and the rear side 34 of the rear cover 16 is directed toward the wall 26. The rear side 34 of the rear cover 16 may be substantially flush with the wall 26. When the fan 20 is inserted into the lower electrical base 12, and the electrical base 12 is plugged in, the fan 20 extends substantially parallel with the wall 26 surface. The fan 20 may be inserted into the lower electrical base 12 before or after the insect trap 10 is plugged into the wall 26.

When the LEDs 44 are lit, which may occur automatically when the insect trap 10 is plugged into the wall 26, manually when switched on by the user by a switch, or pre-programmed by the insect trap 10, the light from the LEDs 44 of the light bar 30 are directed laterally in left and right directions 42. The light bounces off the rear surface 62 of the fan 20 and off the rear wall 26 to produce a "halo effect" that attracts insects to the insect trap 10. The light may also double as a night-light or sconce.

Insects are drawn to the insect trap 10 by the emission of light and land on the rear surface 62 of the fan 20 thus getting trapped to the adhesive material 64. Once the rear surface 62 is sufficiently covered with trapped insects, or after a designated amount of time has passed when the exposed adhesive material 64 loses its effectiveness, the fan 20 may be exchanged by sliding the fan 20 upward (or sideways) while being held by the user at the non-sticky upper edge 66 to remove the fan 20 from the slot 50. An unused fan 20 may be replaced by sliding the fan 20 downward (or sideways) into the slot 50 of the lower electrical base 12.

The insect trap 10 provides a discreet trapping method that hides the adhesive material 64 from forward view so that the trapped insects are not seen. The fan 20 both functions to block light and provide the adhesive substance so that additional housing or enclosure structure is eliminated. The fan 20, therefore, is more easily replaceable by the user and has a pleasing aesthetic.

The sideways-emitted light of the light bar 30 allows light to be primarily directed outward to produce the "halo effect" without wasting energy by emitting light directly into the wall 26 or into the fan 20 which is then absorbed. In this respect, the use of LEDs is optimized.

Certain terminology is used herein for purposes of reference only, and thus is not intended to be limiting. For example, terms such as "upper", "lower", "above", and "below" refer to directions in the drawings to which reference is made. Terms such as "front", "back", "rear", "bottom" and "side", describe the orientation of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first", "second" and other such numerical terms referring to structures do not imply a sequence or order unless clearly indicated by the context.

When introducing elements or features of the present disclosure and the exemplary embodiments, the articles "a", "an", "the" and "said" are intended to mean that there are one or more of such elements or features. The terms "comprising", "including" and "having" are intended to be inclusive and mean that there may be additional elements or features other than those specifically noted. It is further to be understood that the method steps, processes, and operations described herein are not to be construed as necessarily requiring their performance in the particular order discussed or illustrated, unless specifically identified as an order of performance. It is also to be understood that additional or alternative steps may be employed.

It is specifically intended that the present invention not be limited to the embodiments and illustrations contained herein and the claims should be understood to include modified forms of those embodiments including portions of the embodiments and combinations of elements of different embodiments as come within the scope of the following claims. All of the publications described herein, including patents and non-patent publications, are hereby incorporated herein by reference in their entireties.

We claim:

1. A plug-in insect trap comprising:
an electrical housing having rearwardly extending electrical connectors to be connectable into an electrical outlet of a rear wall along an insertion axis, the electrical outlet flanked by left and right lateral regions of the rear wall, and a base having an upwardly opening card slot extending substantially perpendicular to the insertion axis in a fixed orientation when the electrical connectors are connected to the electrical outlet;
an insect attractant lamp supported by the base and extending upwardly from the base;
an upwardly extending planar card having an upper end opposite a lower end defining a height and a left edge opposite a right edge defining a width and having a rear planar surface defining an outer periphery of the card, the lower end releasably supported in a fixed orientation by the upwardly opening slot of the base to space the card from the rear wall and extend rigidly upwardly in cantilever from the base substantially perpendicular to the insertion axis and substantially parallel to the rear wall to provide an unobstructed straight line path from a midpoint of the height of the left edge of the rear planar surface to the left lateral region of the rear wall and from a midpoint of the height of the right edge of the rear planar surface to the right lateral region of the rear wall when the electrical connectors are connected to the electrical outlet; and
a sticky insect trapping adhesive attached to the rear planar surface of the upwardly extending card;
wherein the insect attractant lamp is positioned between the upwardly extending card and the rear wall to allow reflection of light off the left and right edges of the rear planar surface to the left and right lateral regions, respectively, of the rear wall when the electrical connectors are connected to the electrical outlet.

2. The insect trap of claim 1, wherein the slot extends downwardly and laterally across an upper end of the electrical housing.

3. The insect trap of claim 2, wherein the upwardly extending card is flanked by outer side walls of the slot of the electrical housing.

4. The insect trap of claim 1, wherein the upwardly extending card is a paper material.

5. The insect trap of claim 1, wherein the card is configured to gaplessly nest in a stack of multiple cards for compact shipment.

6. The insect trap of claim 1, wherein the insect attractant lamp is exclusively positioned rearwardly of the rear planar surface of the upwardly extending card.

7. The insect trap of claim 6, wherein the insect attractant lamp is an upwardly extending light bar supporting a plurality of light emitting elements (LEDs).

8. The insect trap of claim 7, wherein the plurality of LEDs are supported exclusively on left and right sidewalls of the upwardly extending light bar to project light in a primary lateral direction parallel to a surface of the rear wall supporting the electrical outlet when the plug-in insect trap is connected to the electrical outlet.

9. The insect trap of claim 8, wherein the LEDs emit light at two distinct frequency bands.

10. The insect trap of claim 9, wherein the LEDs emit light at 369 nm and 398 nm.

11. The insect trap of claim 6, wherein the upwardly extending card blocks light from the insect attractant lamp in a forward direction.

12. A method of trapping insects comprising the steps of:
providing an insect trap having
an electrical housing having rearwardly extending electrical connectors to be connectable into an electrical outlet of a rear wall along an insertion axis, the electrical outlet flanked by left and right lateral regions of the rear wall, and a base having an upwardly opening card slot extending substantially perpendicular to the insertion axis in a fixed orientation when the electrical connectors are connected to the electrical outlet of the rear wall; and
an insect attractant lamp supported by the base and extending upwardly from the base;
inserting an upwardly extending planar card, the upwardly extending planar card having an upper end opposite a lower end defining a height and a left edge opposite a right edge defining a width and having a rear planar surface defining an outer periphery of the card, into the upwardly opening card slot in a fixed orientation such that the upwardly extending card is spaced from the rear wall and extends rigidly upwardly in cantilever from the base substantially perpendicular to the insertion axis and substantially parallel to the rear wall to provide an unobstructed straight line path from a midpoint of the height of the left edge of the rear planar surface to the left lateral region of the rear wall and from a midpoint of the height of the right edge of the rear planar surface to the right lateral region of the rear wall when the electrical connectors are connected to the electrical outlet;
wherein a sticky insect trapping adhesive is attached to the rear planar surface of the upwardly extending card; and
wherein the insect attractant lamp is positioned between the upwardly extending card and the rear wall to allow reflection of light off the left and right edges of the rear planar surface to the left and right lateral regions, respectively, of the rear wall when the electrical connectors are connected to the electrical outlet; and inserting the electrical connectors into the electrical outlet of the rear wall.

13. The method of claim 12, wherein the upwardly extending card is extended in cantilever to be unattached on the upper end and at the left and right edges of the upwardly extending card.

14. The method of claim 12, wherein the upwardly extending card is inserted in a downwardly direction into the slot of the electrical housing.

15. The method of claim 14, further comprising the step of removing the upwardly extending card in an upward direction.

16. The method of claim 15, wherein the left and right edges of the upwardly extending card are exposed to be manually gripped to be removed in the upward direction.

17. The insect trap of claim 1 wherein the upwardly extending card extends above the base by at least 35 mm.

18. The insect trap of claim 1 wherein the upwardly extending card has a width extending along the upwardly opening card slot that is greater than a width of the base.

* * * * *